United States Patent [19]

Hashimoto et al.

[11] Patent Number: 4,924,199
[45] Date of Patent: May 8, 1990

[54] OPTICAL CARD FOR DATA STORAGE FOR USE IN A DATA RECORDING AND RETRIEVING APPARATUS

[75] Inventors: Akihiko Hashimoto, Hachioji; Toshihiro Kitahara, Akishima; Hiroshi Hashi, Higashimurayama; Takao Rokutan, Koganei, all of Japan

[73] Assignee: Olympus Optical Co., Ltd., Japan

[21] Appl. No.: 50,430

[22] Filed: May 18, 1987

[30] Foreign Application Priority Data

| May 23, 1986 | [JP] | Japan | 61-118663 |
| May 28, 1986 | [JP] | Japan | 61-122892 |
| Mar. 17, 1987 | [JP] | Japan | 62-60228 |

[51] Int. Cl.⁵ .................. G06K 19/06; G06K 7/10
[52] U.S. Cl. ................... 235/494; 235/487; 235/456; 369/44.11
[58] Field of Search .......... 235/454, 456, 487, 488, 235/457, 494; 369/275, 46, 54, 58, 59, 47, 48; 365/234

[56] References Cited

U.S. PATENT DOCUMENTS

| 4,254,329 | 3/1981 | Gokey et al. | 235/454 |
| 4,290,122 | 9/1981 | Bates et al. | 365/234 |
| 4,534,031 | 8/1985 | Jewer | 369/59 |
| 4,562,577 | 12/1985 | Glover et al. | 369/54 |
| 4,598,393 | 7/1986 | Pierce et al. | 369/46 |
| 4,634,850 | 1/1987 | Pierce et al. | 235/487 |
| 4,652,730 | 3/1987 | Marshall | 235/456 |
| 4,695,991 | 9/1987 | Hudson | 235/456 |
| 4,754,127 | 6/1988 | Brass et al. | 235/456 |
| 4,791,622 | 12/1988 | Clay et al. | 369/59 |

FOREIGN PATENT DOCUMENTS

| 60-69836 | 4/1985 | Japan . |
| 61-82286 | 4/1986 | Japan . |
| 61-208688 | 9/1986 | Japan . |

*Primary Examiner*—Aristotelis M. Psitos
*Assistant Examiner*—Richard A. Weinhardt
*Attorney, Agent, or Firm*—Arnold, White & Durkee

[57] ABSTRACT

An optical card for storing a data signal as optically readable pits including a plurality of track units, each track unit being composed of a single control track having an array of square control blocks extending in first direction, and a plurality of data tracks disposed on respective sides of the control track. The control and data tracks are aligned in a second direction perpendicular to the first direction. Data signals forming a single byte are recorded over a plurality of data tracks at positions which are aligned in the second direction. The control blocks in the control track are arranged such that focusing error, tracking error and clock pulses can be detected by processing signals obtained by optically scanning the control blocks.

12 Claims, 16 Drawing Sheets

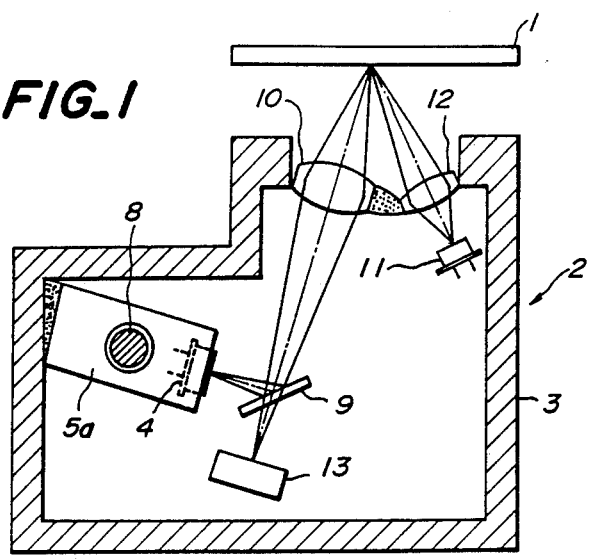
FIG_1
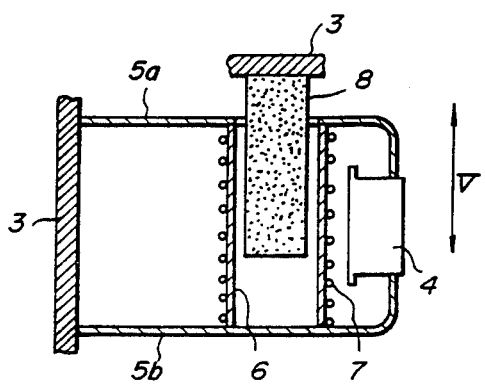
FIG_2
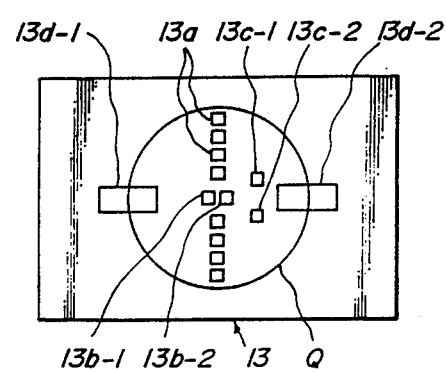
FIG_3

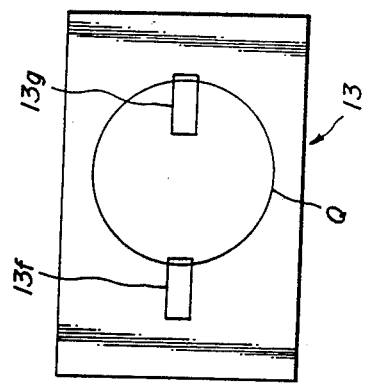
FIG._5C
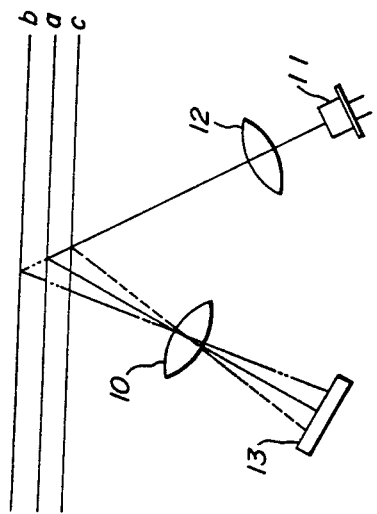
FIG._4
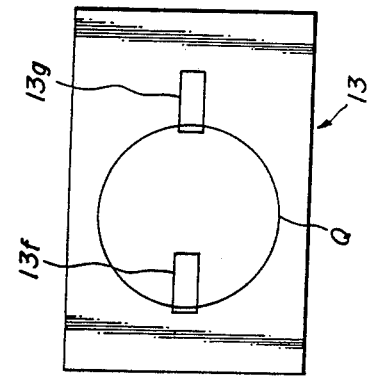
FIG._5B
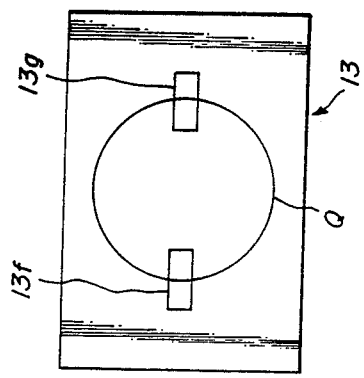
FIG._5A

FIG_6
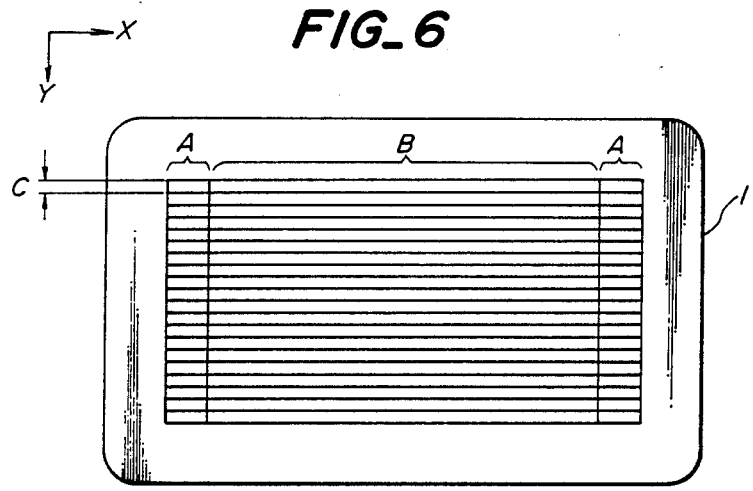
FIG_7
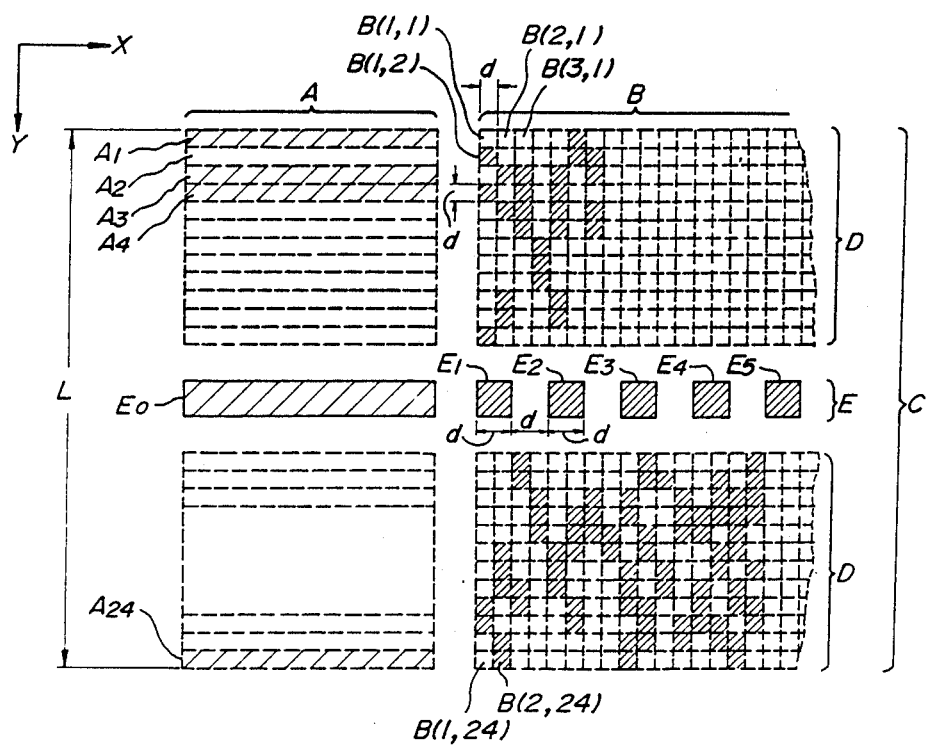

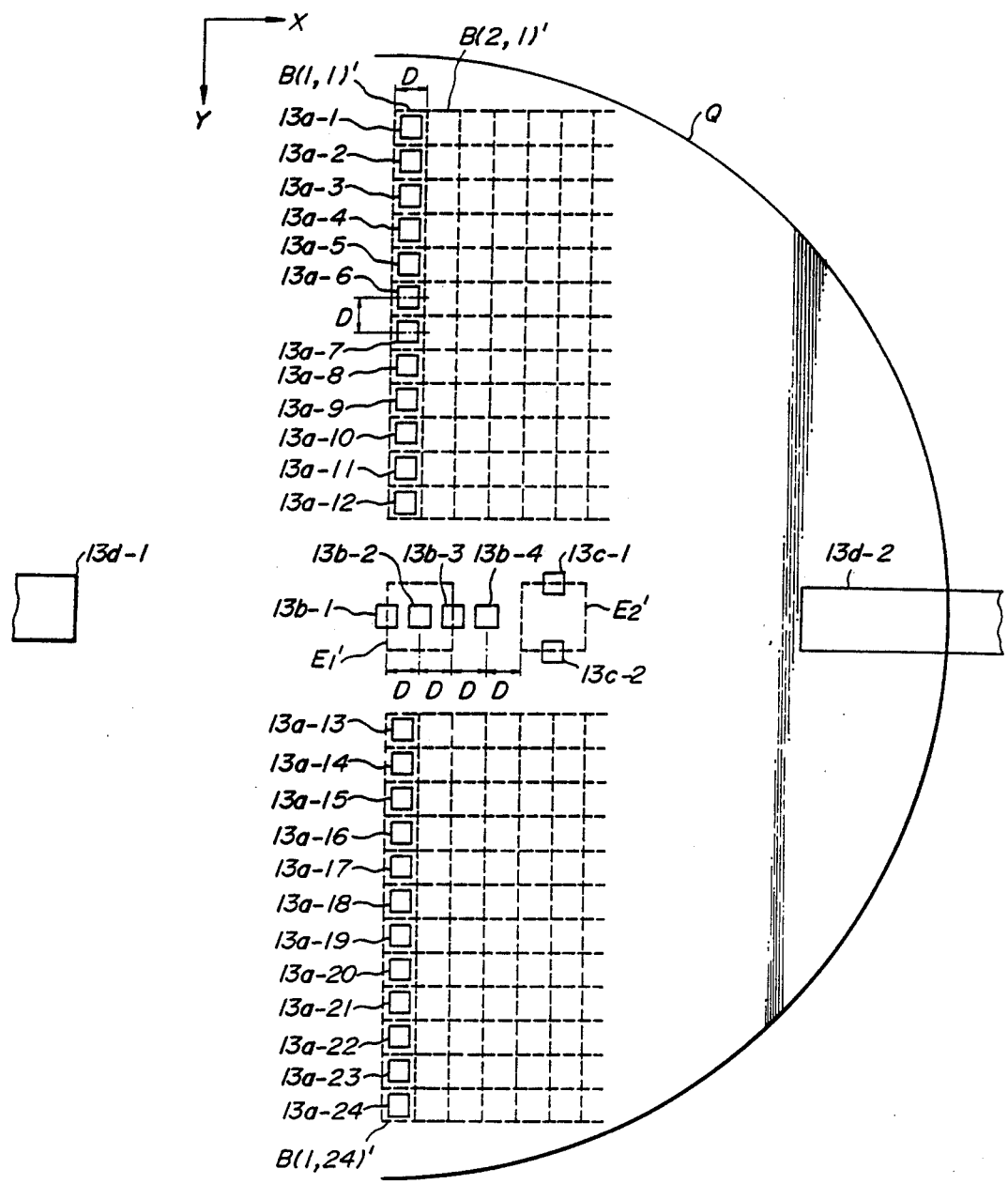
FIG_8

FIG_10
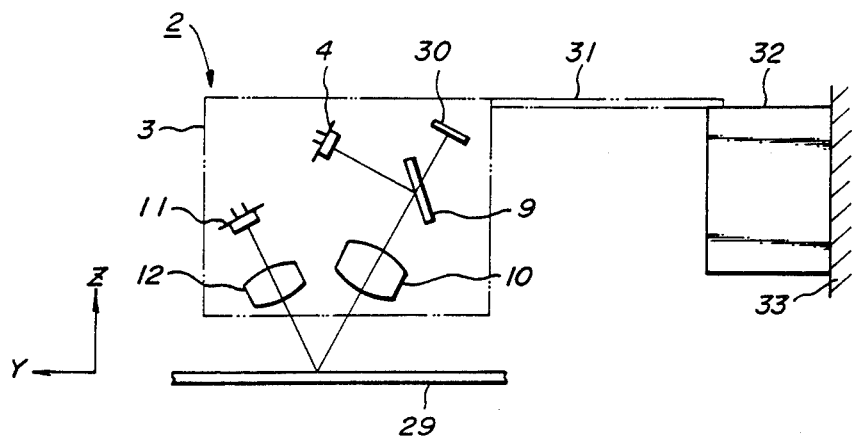
FIG_11
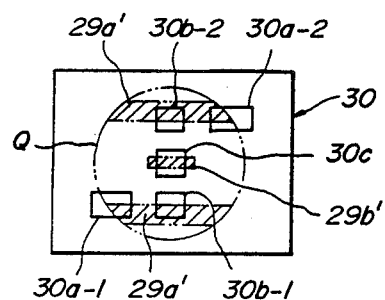

FIG_12A
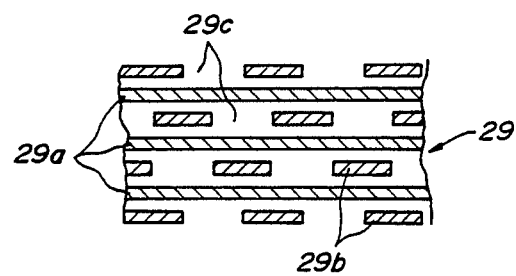
FIG_12B
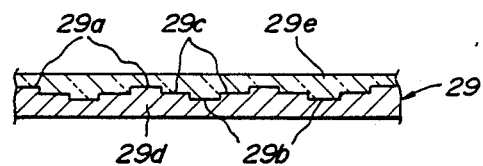

FIG_13
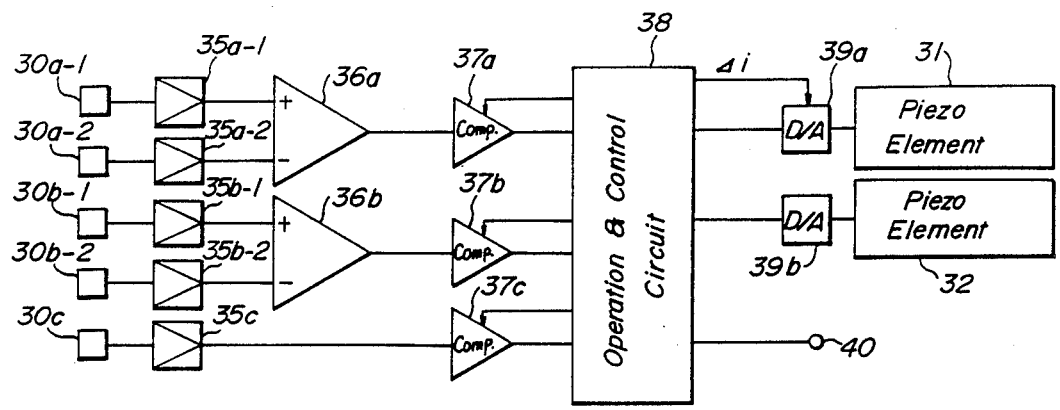
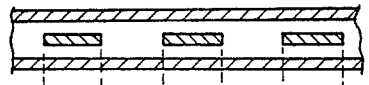
FIG_14A
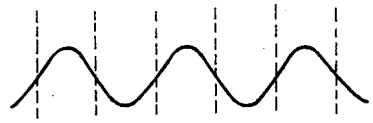
FIG_14B
FIG_14C 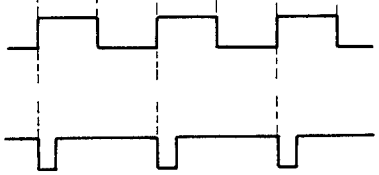
FIG_14D 

FIG_15
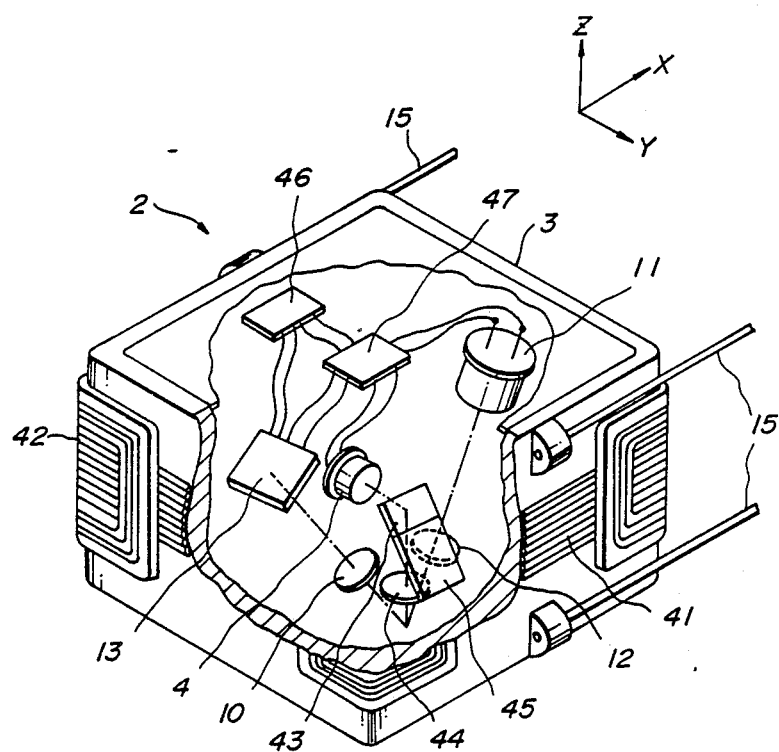

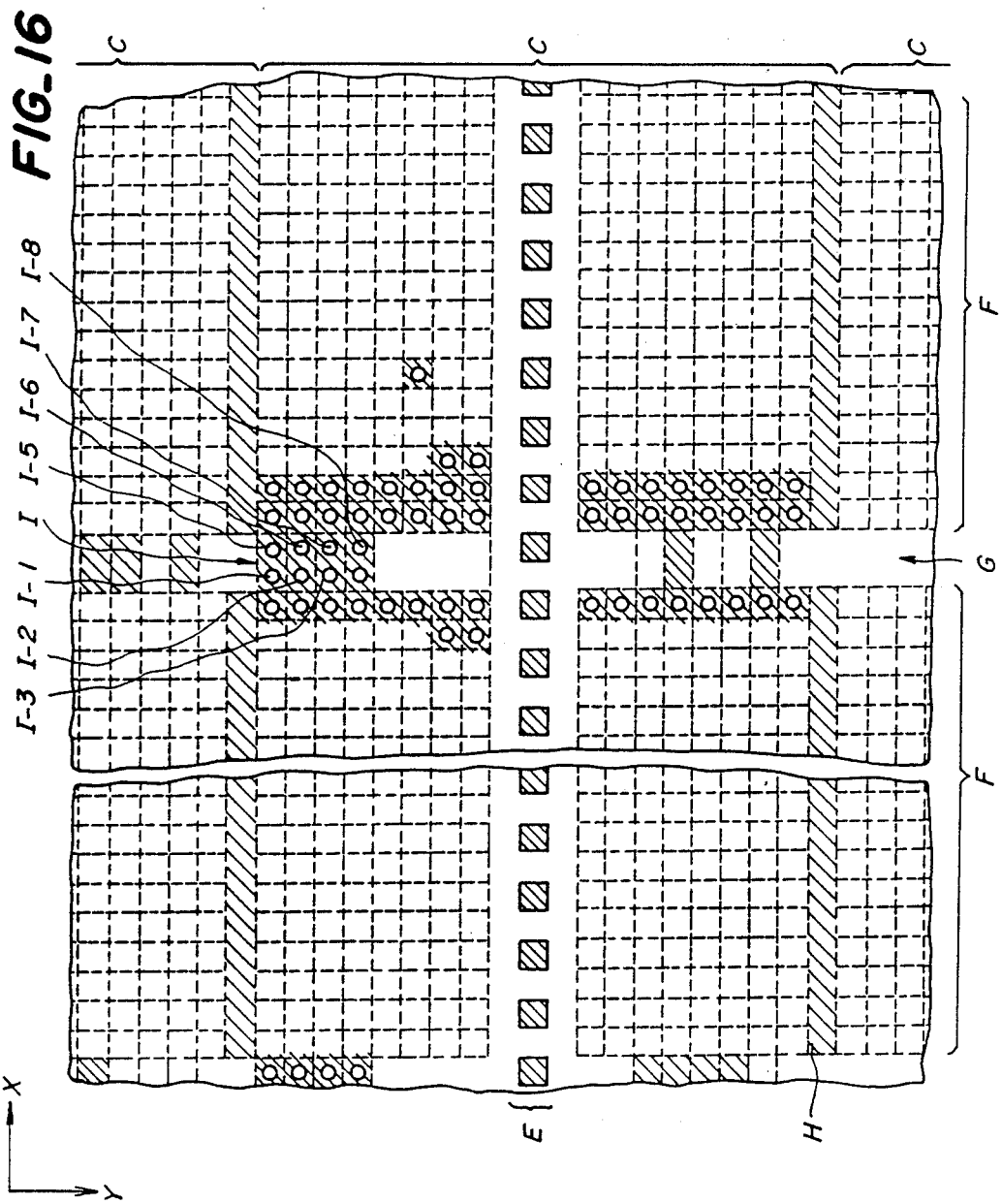

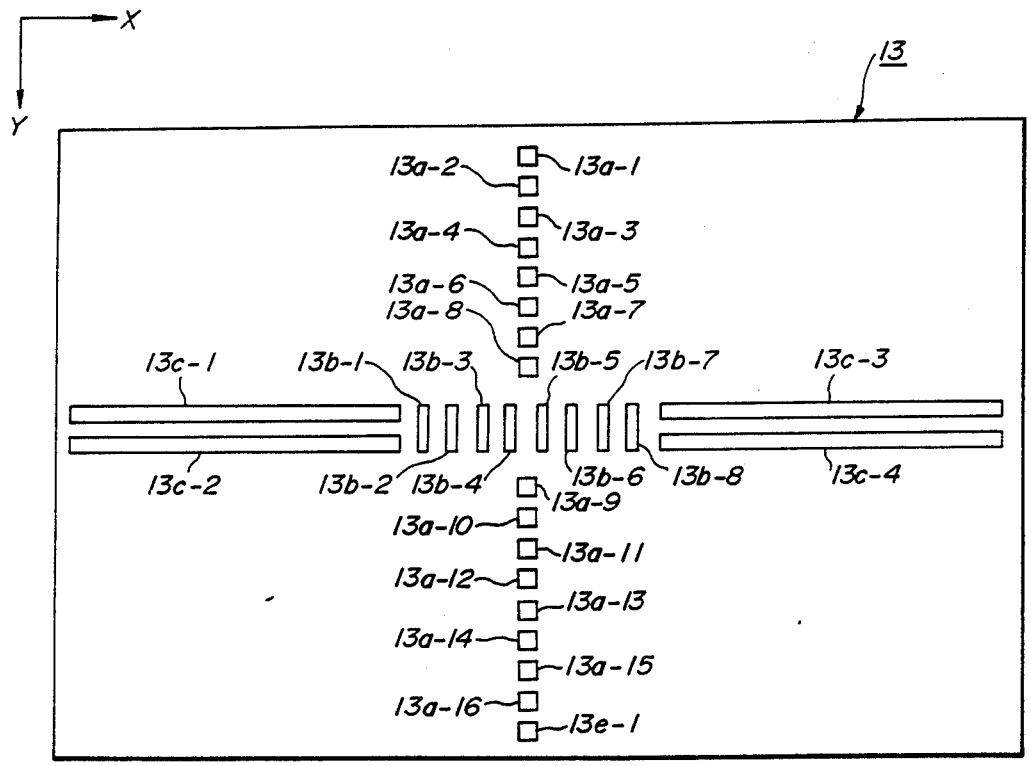
FIG_17

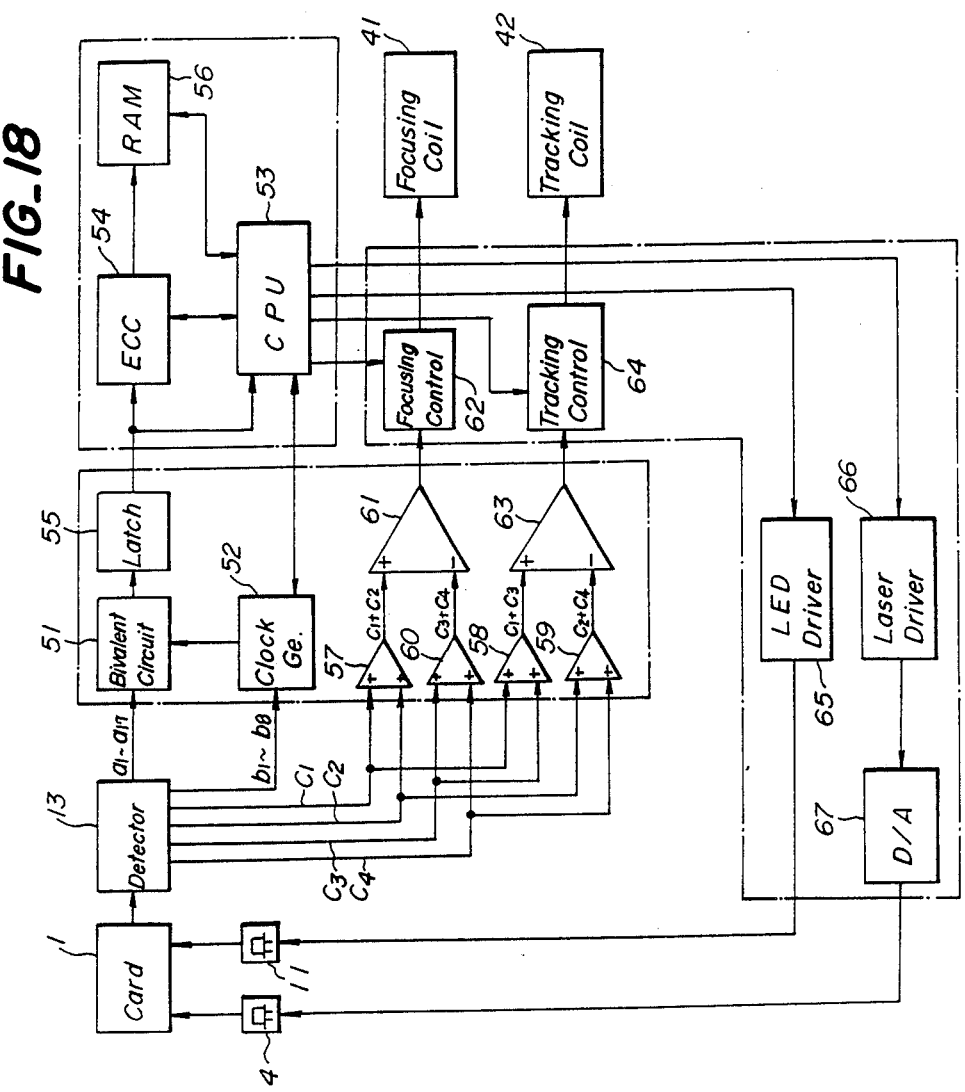

FIG_20
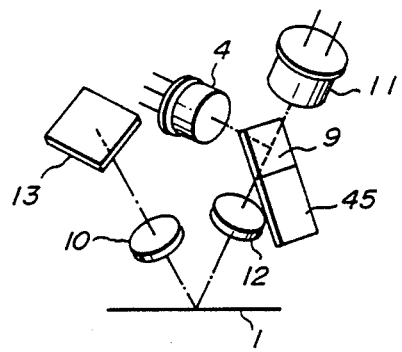
FIG_21
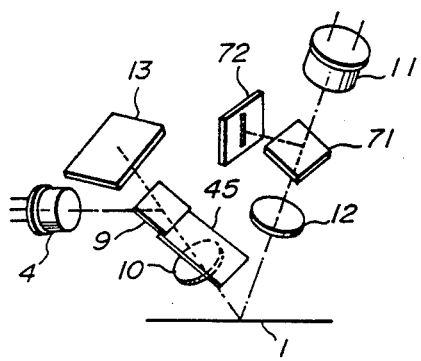

FIG_22
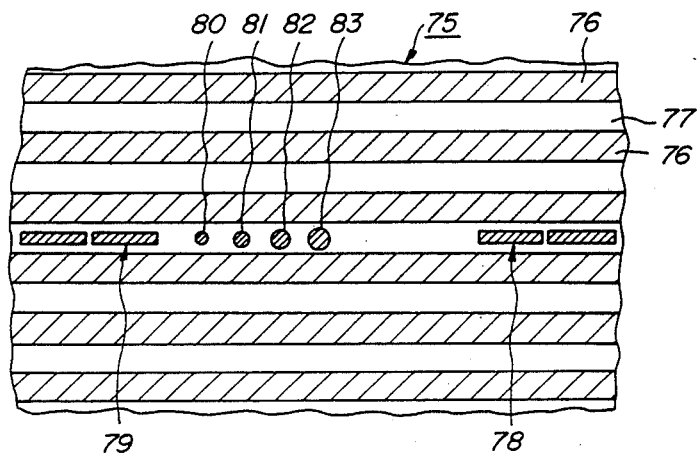
FIG_23
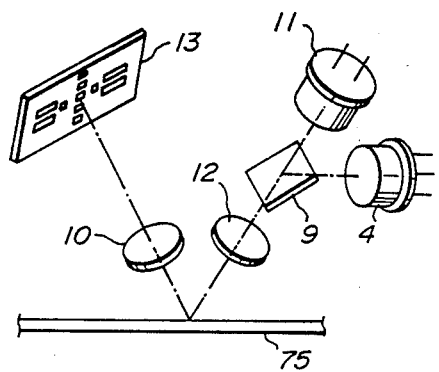

FIG_24
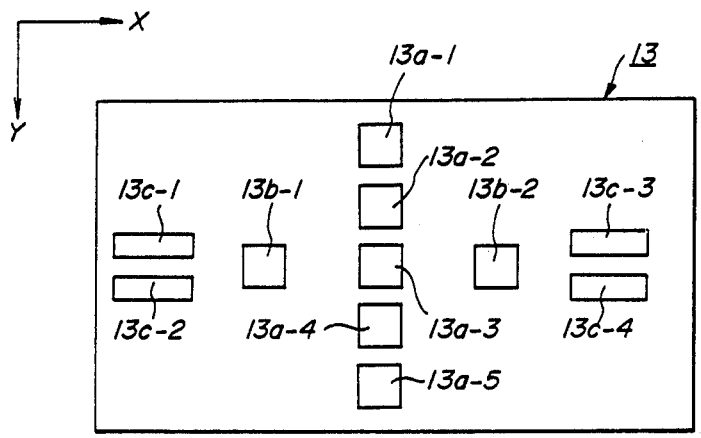
FIG_25
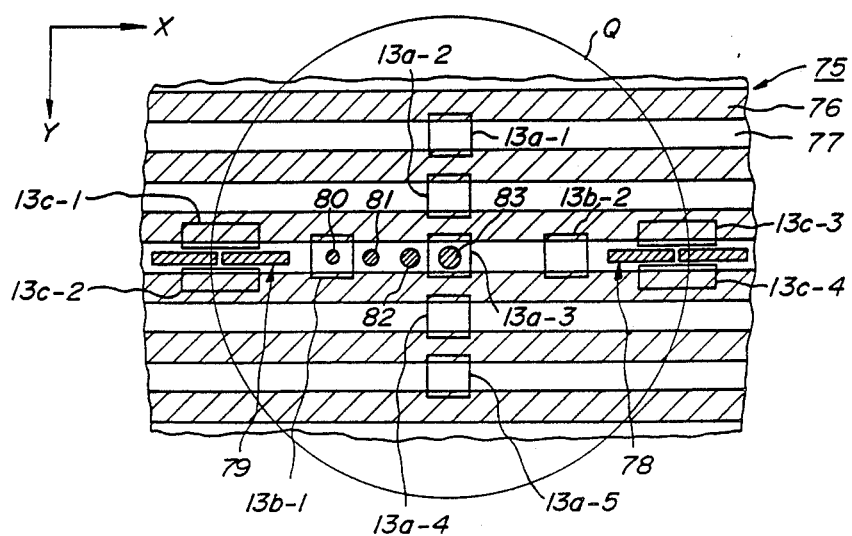

OPTICAL CARD FOR DATA STORAGE FOR USE IN A DATA RECORDING AND RETRIEVING APPARATUS

BACKGROUND OF THE INVENTION

FIELD OF THE INVENTION

The present invention generally relates to an optical data recording and retrieval technique, and more particularly to an apparatus for reading and/or writing a data signal with respect to an optical card and an optical card for use in such an apparatus.

DESCRIPTION OF THE PRIOR ART

Optical data recording and retrieval systems have been described in many articles. For instance, in U.S. Pat. No. 4,634,850 there is disclosed an optical card read and/or write system. In such a system quite a large amount of data can be stored in a wallet-sized card as optically readable pits. In general, on the card there are provided a number of tracks and each track is composed of a plurality of lines. A single byte of data consisting of a plurality of bits are arranged in a direction Y which is perpendicular to direction X, the direction in which the tracks extend. In order to read out the data stored on the card, a light spot having such a diameter that all pits forming at least a single byte are simultaneously illuminated, and an image of an illuminated portion of the card is formed on a photodetector. The photodetector comprises an array of detectors which corresponds to the array of pits forming the single byte. Therefore, the data signal of the single byte can be read out simultaneously.

In the optical card reading and/or writing apparatus, a light beam is made incident upon the card generally along an inclined optical path and the reflected light is made incident upon the photodetector also along an inclined optical path. In FIG. 6 of the above mentioned U.S. Pat. No. 4,634,850 there is shown such an optical arrangement. Similar optical arrangements are also shown in Japanese Patent Application Laid-open Publications (Kokai) Nos. 60-69836, 61-82286 and 61-208688. However, these references do not mention anything about the focusing control as well as the tracking control. In order to effect the reading and writing in an accurate manner, it is necessary to perform the focusing control and the tracking control. Particularly, the card is usually carried in the pocket of a user so that the card is liable to be curved. Further, the card reading and/or writing apparatus preferably is of a simple construction to reduce its cost. Therefore, when the card is fed with respect to an optical head having a light source, a photodetector and lenses, the distance between the card and head is liable to vary, so that there might be produced focusing and tracking errors. Further, the feeding speed of the card might be varied and thus the data signal not derived accurately and not recorded at correct positions on the card. That is to say, it is difficult to synchronize the feeding operation of the card with the reading and writing operation. In order to increase the data storage capacity of the card, it is necessary to effect the focusing and tracking control, and to synchronize the data reading and writing operation with the feeding of the optical card.

SUMMARY OF THE INVENTION

The present invention has for its object to provide a novel and useful optical card by means of which the reading and/or writing operation can be carried out in an accurate manner.

It is another object of the invention to provide an optical card on which a large amount of data can be stored at a high record density.

It is still another object of the invention to provide an apparatus for reading and/or writing data with respect to an optical card in an accurate manner so that a large amount of data can be stored on the optical card.

According to the invention an optical card for storing a data signal as optically readable pits comprises
a substrate bearing a data storing area; and
a plurality of track units formed in the data storing area, each of said track units including at least one data track and at least one control track which extend in a first direction parallel with each other and aligned with each other in a second direction perpendicular to said first direction; whereby said control track is of a configuration and arrangement such that focusing error and tracking error can be derived by optically detecting said control track.

The present invention is directed to an apparatus for reading and/or writing a data signal with respect to an optical card having a plurality of track units, each being composed of a plurality of data tracks and a control track which are extended in a first direction and are aligned in a second direction perpendicular to the first direction, comprising
an optical head means including a reading light source for emitting a reading light beam, a first optical system for projecting the reading light beam onto the optical card, a second optical system for forming an image of a part of the optical card which part is illuminated by the reading light beam, a photodetector for receiving said image of the illuminated part of the optical card, a writing light source for emitting a writing light beam modulated in accordance with a data signal to be written, and a third optical system for projecting said writing light beam onto the optical card;
a first driving means for moving the optical card and the optical head means relative to each other in the first direction;
a second driving means for moving the optical card and the optical head means relative to each other in the second direction;
a third driving means for moving the optical card and the optical head means relative to each other in a third direction perpendicular both to the first and second direction;
a fourth driving means for moving the writing light beam on the optical card in the second direction;
a first circuit means for detecting a focusing error by processing an output signal from said photodetector to generate a focusing control signal by means of which said third driving means is driven to correct the focusing error; and
a second circuit means for detecting a tracking error by processing the output signal from said photodetector to generate a tracking control signal by means of which said second driving means is driven to correct the tracking error.

BRIEF DESCRIPTION OF THE DRAWINGS

FIG. 1 is a schematic cross section showing an optical head of an embodiment of the optical card reading and writing apparatus according to the invention;

FIG. 2 is a cross sectional view depicting a semiconductor laser moving mechanism;

FIG. 3 is a plan view illustrating a construction of a photodetector;

FIG. 4 is a schematic view for explaining the principle of detecting a focusing error according to the invention;

FIGS. 5A, 5B and 5C are schematic views for explaining the principle of detecting a focusing error according to the invention;

FIG. 6 is a plan view showing an embodiment of the optical card according to the invention;

FIG. 7 is a schematic view depicting a data format of the card;

FIG. 8 is a schematic view showing the positional relationships between the photodetector and images of data pits and control pits formed on the card;

FIG. 10 is a schematic view showing an optical head of another embodiment of the optical card reading and writing apparatus according to the invention;

FIG. 11 is a schematic plan view illustrating a photodetector;

FIGS. 12A and 12B are plan and cross sectional views, respectively of another embodiment of the optical card according to the invention;

FIG. 13 is a block diagram showing a signal processing circuit;

FIGS. 14A to 14D are waveforms for explaining the operation of the signal processing circuit;

FIG. 15 is a perspective view showing an optical head of still another embodiment of the optical card reading and writing apparatus according to the invention;

FIG. 16 is a data format of another embodiment of the optical card according to the invention;

FIG. 17 is a plan view showing the construction of a photodetector;

FIG. 18 is a block diagram of a signal processing circuit;

FIG. 20 is a schematic view illustrating an embodiment of the optical head according to the invention;

FIG. 21 is a schematic view illustrating an additional embodiment of the optical head according to the invention;

FIG. 22 is a plan view showing the data format of still another embodiment of the optical card according to the invention used in another embodiment of the reading and writing apparatus according to the invention;

FIG. 23 is a schematic view depicting an optical head of this embodiment;

FIG. 24 is a plan view showing a construction of a photodetector; and

FIG. 25 is a schematic view illustrating the positional relationship between the photodetector and pits on the card.

DESCRIPTION OF THE PREFERRED EMBODIMENTS

Figure 9:
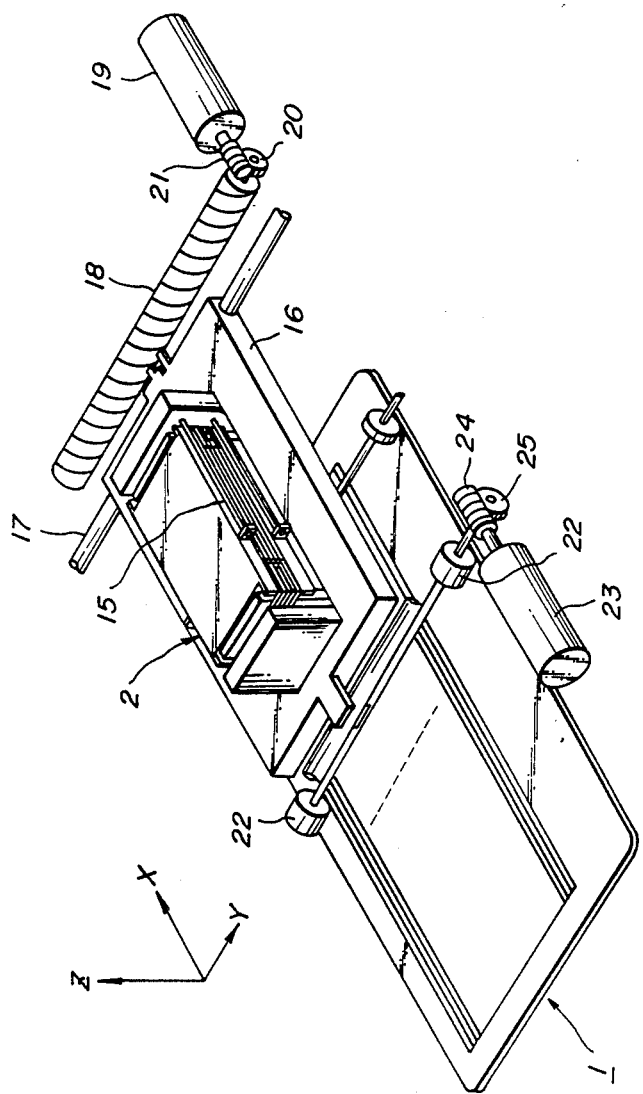
FIG. 9 is a perspective view illustrating a mechanism for moving the head and feeding the card.

FIG. 1 is a schematic cross section showing an embodiment of the optical card reading and writing apparatus according to the invention. In FIG. 1, an optical data storage memory 1 in the form of a wallet sized card is optically scanned by a reading and writing head 2 comprising a housing 3 and a data writing semiconductor laser 4. As clearly shown in FIG. 2, the laser 4 is supported by the ends of a pair of parallel leaf springs 5a and 5b whose other ends are secured to the housing 3. Therefore, the laser 4 can be moved in a direction V. The leaf springs 5a and 5b are connected with each other by means of a bobbin 6 around which is wound a coil 7. Into a central hole of the bobbin 6 is inserted a cylindrical permanent magnet 8 which is secured to the housing 3. When an electric current is passed through the coil 7, the coil is moved in the direction V due to the action of a magnetic field generated by the magnet 8. Therefore, the laser 4 is also moved in the direction V.

A light flux emitted by the laser 4 is reflected by a half mirror 9 toward an objective lens 10. The light flux is focused by the objective lens 10 onto the card 1 as a microscopic spot.

There is further provided a reading light source such as a light emitting diode (LED)11. A light flux emitted form the LED 11 is focused by an objective lens 12 onto the card 1 as a light spot. The light flux reflected by the card 1 is focused by the objective lens 10 onto a photodetector 13 via the half mirror 9. FIG. 3 is a plan view showing an arrangement of detectors of the photodetector 13. The photodetector 13 comprises a data reading detector array 13a, a pair of clocking detectors 13b-1 and 13b-2, a pair of tracking detectors 13c-1 and 13c-2, and a pair of focusing detectors 13d-1 and 13d-2. In FIG. 3, a circle Q represents the light spot of the reading light beam on the photodetector 13. The pattern of the detectors of the photodetector 13 corresponds to the data format recorded on the card 1. This will be discussed later in detail.

When writing data on the card 1, the laser 4 is turned ON and OFF in accordance with the data to be recorded, and at the same time the electric current is passed through the coil 7 to move the laser 4 in the direction V, so that the laser spot is moved in a direction perpendicular to the plane of the drawing of FIG. 1. This direction is widthwise relative to the card 1. In this manner, the data is recorded on the card 1 in the form of a pit array extending in the widthwise direction. As will be explained later, the LED 11 is energized during the writing operation.

When reading data out of the card 1, the light flux emitted by the LED 11 is focused by the objective lens 12 on the card and an illuminated image is formed on the photodetector 13 by means of the objective lens 10 via the half mirror 9. In FIG. 4, when the card 1 is in a focused position a, the light spot Q is formed at a center of the photodetector 13 and thus the focusing detectors 13f and 13g receive the same amount of light as illustrated in FIG. 5A and produce an output signal having the same amplitude. When the card 1 deviates from the focused position a into non-focused positions b and c, the light spot Q is shifted on the photodetector 13 as shown in FIGS. 5B and 5C, respectively. As a result, the output signals of the detectors 13f and 13g differ from each other. It should be noted that in FIGS. 5A to 5C, the detectors other than the focusing detectors 13f and 13g are omitted for the sake of simplicity.

The difference between the output signals from the focusing detectors 13f and 13g is derived by a differential amplifier. In the focused position a the output of the differential amplifier is zero, while in the non-focused positions b and c, the output of the differential amplifier is positive and negative, respectively, and the amplitude of the output represents the amount or degree of the defocus. In this manner, it is possible to derive a focusing error signal from the differential amplifier. Then, by moving the head 2 in a direction perpendicular to the card 1 in accordance with the thus detected focusing error signal, the light spot Q can be always situated at the center of the photodetector 13 to effect the focusing control. In the present embodiment, the head 2 is moved with respect to the card 1, but the card 1 may be moved with respect to the head 2.

As explained above, in the reading and writing apparatus of this embodiment, the writing light emitted from the laser 4 is projected onto the card 1 along an optical axis of the photodetector 13. This results in accurate writing as will be explained later. That is to say, the focusing error does not affect the position of pits recorded on the card 1.

FIGS. 6 and 7 show the construction of an embodiment of the card 1 according to the invention. FIG. 6 is a plan view illustrating the record format on the card 1 and FIG. 7 shows a format of a single track on an enlarged scale. The record area of the card 1 is divided into two address sections A and one data section B viewed in a lengthwise direction X. These address and data sections A and B are further divided into a number of track units C spaced from one another in a widthwise direction Y. It should be noted that the two address sections A are provided at opposite ends of the card 1, so that the card can be read from either end of the card in the direction X. However, if the card is fed only from one end, it is sufficient to provide only one address section A. As shown in FIG. 7, each track unit C is composed of a plurality of data tracks D and one control track E. In the present embodiment, there are arranged twelve data tracks D on respective sides of the control track E, and data pits in these twelve data tracks D constitute a single byte. The width L of the track unit C is about 100 μm. In each address section A of respective track units C, there are alotted twenty four lines $A_1$ to $A_{24}$, and in the extreme lines $A_1$ and $A_{24}$ there are always formed pits to constitute a fixed pattern for identifying the track unit. The remaining twenty-two lines $A_2$ to $A_{23}$ are used to record a track unit number. It should be noted that in these lines $A_2$ to $A_{23}$, in addition to the track unit number, there may be recorded various kinds of information such as indices of an electronic dictionary and a mark for denoting whether a relevant track unit has already been recorded or not. In the address section A, there is further formed a tracking pit $E_0$. In the control track E of the data section B, there are formed a number of control pits $E_1$, $E_2$, ... having a rectangular shape. These control pits serve to generate a clock signal and a tracking error signal as will be explained later. In the data tracks D there are alotted a number of data pit regions B(1,1), B(1,2) ... B(1,24); B(2,1), B(2,2) ... B(2,24); B(3,1) .... In FIG. 7, hatched regions denote data pits in which one of the logic signals 1 and 0 has been already written. For instance, the hatched data pits represent a logic low level (0) and non-hatched regions denote a logic high level (1). Each of the data pits has a length d and width d viewed in the directions X and Y. Then each of the control pits $E_1$, $E_2$ ... has a width 2d and successive control pits are separated by a distance 2d. In the present card 1, the control pits $E_1$, $E_2$ ... are aligned with arrays of data pits B (n,m) viewed in the direction Y. Therefore, the control pits $E_1$, $E_2$ ... are arranged in the direction X at a pitch 4d. Therefore, a second control pit $E_2$ is aligned with respect to fifth and sixth data arrays B(5,1), B(5,2) ... B(5,24), and B(6,1), B(6,2) ... B(6,24) viewed in the direction Y.

FIG. 8 shows a detailed construction of the photodetector 13. In FIG. 8 images of the data pits and control pits are also shown by broken lines and are denoted by the corresponding reference numerals with dashes. Further, in FIG. 8 the light spot image formed on the photodetector 13 is shown by a circle Q. The light spot on the card 1 is projected through the objective lens 10 onto the photodetector 13 at an enlargement factor k. The photodetector 13 comprises two arrays of data detectors 13a-1 to 13a-12 and 13a-13 to 13a-24 arranged on respective sides of the control track, four clocking detectors 13b-1 to 13b-4, two tracking detectors 13c-1 and 13c-2, and two focusing detectors 13d-1 and 13d-2. The data detectors are arranged at a pitch WD($D=K \cdot d$) in the direction Y and the clocking detectors 13b-1 to 13b-4 are arranged at a pitch D in the direction X. Further, the tracking detectors 13c-1 and 13c-2 are separated in the direction Y by a pitch 2D.

FIG. 9 is a perspective view showing the head driving mechanism. The head 2 is supported by four resilient rods or wires 15 movable in the direction Y as well as in the direction Z, i.e., a direction perpendicular to the X and Y directions. That is to say, the direction Z is normal to the surface of card 1. The wires 15 are connected to a plate 16 which is slidably supported by a guide rod 17 extending in the direction Y. One end of the plate 16 engages a screw 18 which is rotated by a motor 19 via gears 20 and 21. The card 1 is moved in the direction X by means of rollers 22 and a motor 23 which are coupled with each other by gears 24 and 25. When the motor 19 is energized, the head 2 is moved in the direction Y and when the motor 23 is energized, the card 1 is moved in the direction X. Further, by driving the head 2 in the direction Y, it is possible to effect the tracking control. Further when the head 2 is moved in the direction Z, it is possible to effect the focusing control.

Now the data reading operation will be explained. At first, the card 1 is moved in the direction X by driving the motor 23 so that the address section A of the card 1 is moved under the head 2. Then the motor 19 is energized to move the head 2 in the direction Y to effect the so-called seek. During this seek movement, output signals from the tracking detectors 13c-1 and 13c-2 are compared with each other. When a tracking pit $E_0$ in an address section A is equally detected by the tracking detectors 13c-1 and 13c-2, output signals from the outermost data detectors 13a-1 and 13a-24 are checked. As explained above, in the outermost lines $A_1$ and $A_{24}$ in the address section A is always a fixed pattern of pits common to each track unit. Accordingly, it can be confirmed that the head 2 has been correctly positioned with respect to a track unit C. Next, by processing output signals from the data detectors 13a-2 to 13a-23, a track number is read. When the thus read track number is one which is desired, the readout operation is initiated. But if the read track number is not a desired one, the seek operation is continued until a desired track is detected.

In order to read the two bytes of data stored in the first array of the data pits B(1,1) to B(1,24), it is necessary to align accurately the data detectors 13a-1 to 13a-24 with respect to the first data pit array as illustrated in FIG. 8. By detecting the difference between output signals from the clocking detectors 13b-1 and 13b-3 by means of a differential amplifier, it is possible to detect a deviation between the data detectors and the data pit array in the direction X. That is to say, the polarity of the difference represents the direction of the deviation and the amplitude of the difference signal represents the amount of the deviation. When the difference signal falls below a predetermined low level, it can be confirmed that the data pits B(1,1) to B(1,24) are correctly aligned to the data detectors 13a-1 to 13a-24, respectively. Then there is produced a clock pulse. At the same time, output signals from the tracking detectors 13c-1 and 13c-2 are compared with each other by a differential amplifier to generate a tracking error signal. It should be noted that when the tracking detectors 13c-1 and 13c-2 are situated between successive control tracks $E_1'$, and $E_2'$, the tracking error signal cannot be produced. Therefore, the output signal of the tracking differential amplifier is gated by gate pulses synchronized with the clock pulses. That is to say, only when the tracking detectors 13c-1 and 13c-2 receive the image $E_i'$ of the control pit $E_i$ is the tracking error signal derived. The head 2 is moved in the direction Y in accordance with the tracking error signal by means of an electromagnetic driving mechanism which is commonly used in optical disc read/write systems or optical disc players. The clock pulse is also used to gate out output signals supplied from the data detectors 13a-1 to 13a-24. That is to say, when the clock pulse is generated, the output signals from the data detectors are sampled and held. In this manner, the driving mechanism for moving the card 1 in the direction X is free from severe requirements.

The card 1 is further moved in the direction X to read a second data pit array B(2,1), B(2,2) . . . B(2,24). In this case, a clock pulse is generated by deriving the difference between output signals from the clocking detectors 13b-2 and 13b-4. In synchronism with the thus generated clock pulse, the tracking control and the data readout are effected. Further, when reading out a third data pit array B(3,1) to B(3,24), output signals from the first and third clocking detectors 13b-1 and 13b-3 are used again to generate a clock pulse.

In the above embodiment, the recording laser beam emitted from the laser 4 is deflected in the direction Y by moving the laser light source with the aid of the moving coil 7. It should be noted that the recording laser beam may be deflected in the direction Y by means of various mechanisms. For instance, a relay lens arranged between the laser 4 and the objective lens 10 may be moved by a moving coil mechanism. Further, the half mirror 9 or a reflection mirror may be swung by a mechanism having piezoelectric elements.

FIG. 10 shows schematically the head of another embodiment of the optical card reading and writing apparatus according to the invention. In this embodiment, portions similar to those of the previous embodiment are denoted by the same reference numerals. The optical head 2 comprises a housing 3 in which are arranged a laser diode 4 for emitting a writing laser beam, a half mirror 9, an objective lens 10, a light emitting diode 11, an objective lens 12 and a photodetector 30. The construction within the housing 3 is entirely same as that of the previous embodiment, and the light flux emitted from the light emitting diode 11 is projected upon a card 29 in an inclined fashion and the writing light beam emitted from the laser diode 4 is made incident upon the card 29 along the optical axis of the photodetector 30. The housing 3 is coupled via a focusing piezoelectric element 31 and a tracking piezoelectric element 32 with a fixed member 33 such as the casing of the apparatus. Therefore, by driving the focusing piezoelectric element 31, the housing 3 is moved in the direction Z perpendicular to the surface of the card 29, and by driving the tracking piezoelectric element 32, the housing 3 is moved in the direction Y.

FIG. 11 is a plan view showing the construction of the photodetector 30. The photodetector 30 comprises two focusing detectors 30a-1, 30a-2, two tracking detectors 30b-1, 30b-2, and a single data reading detector 30c. The focusing detectors 30a-1 and 30a-2 are arranged symmetrically to the detector 30c, and similarly the tracking detectors 30b-1 and 30b-2 are provided symmetrically to the data reading detector 30c.

FIGS. 12A and 12B are plan and cross sectional views of the card 29 of the present embodiment. The card 29 comprises a number of track units each being composed of two pre-record sections 29a and a write section 29b situated therebetween. As shown in FIG. 12B, the pre-record section 29a is situated above a reference level 29c, and the write section 29b is situated below the reference level 29c. The pre-record section 29a is used to derive a tracking error signal, and the write section 29b is used to write data therein. When the light spot is focused on the pre-record section 29a, the spot is not focused on the write section 29b and vice-versa. The pre-record section 29a, write section 29b and reference level 29c are formed on a substrate 29d and a transparent protection layer 29e is applied over the substrate 29d.

When the light beam emitted from the light emitting diode 11 is just focused on the pre-record section 29a and no tracking error occurs, images 29a' of two adjacent pre-record sections are equally formed on the focusing and tracking detectors 30a-1, 30b-1 and 30a-2, 30b-2 as illustrated in FIG. 11. When a tracking error occurs in one direction, the amount of light impinging upon one tracking detector 30b-1 is increased and that upon the other tracking detector 30b-2 is decreased. Further, when a focusing error occurs in one direction, the amount of light impinging upon one focusing detector 30a-1 is increased and that upon the other focusing detector 30a-2 is decreased.

FIG. 13 is a block diagram showing a signal processing circuit for effecting the focusing and tracking controls. Output signals from the focusing detectors 30a-1 and 30a-2 are supplied via amplifiers 35a-1 and 35a-2 to a differential amplifier 36a, and an output signal from the differential amplifier 36a is supplied via a comparator 37a to an operation and control circuit 38. Similarly, outputs of the tracking detectors 30b-1 and 30b-2 are connected via amplifiers 35b-1 and 35b-2, respectively to a differential amplifier 36b whose output is connected via a comparator 37b to the operation and control circuit 38. An output signal of the data reading detector 30c is connected through an amplifier 35c and a comparator 37c to the operation and control circuit 38.

In the operation and control circuit 38, the focusing error is detected from the output signal of the comparator 37a to produce a focus error signal which is supplied to the focusing piezoelectric element 31 via a D/A converter 39a. Further the operation and control circuit 38 generates a tracking error signal in accordance with the output signal from the comparator 37b, and the tracking error signal is supplied to the tracking piezoelectric element 32 by means of a D/A converter 39b. The operation and control circuit 38 processes the output signal from the comparator 37c and produces a data signal at an output terminal 40. The operation and control circuit 38 further functions to produce a focus correction signal $\Delta_i$ which is supplied to the D/A converter 39a, so that a difference in the level between the pre-record section 29a and the write section 29b can be compensated for. This will be further explained.

At first the head 2 is moved by the piezoelectric elements 31 and 32 by means of the focusing and tracking error signals in such a manner that the output signals from the differential amplifiers 36a and 36b become zero. After the focusing and tracking controls have been completed, the focus correction signal $\Delta_i$ is supplied from the circuit 38 to the D/A converter 39a so that the light spot is focused on the write section 29b. Then, the detector 30c generates an output signal shown in FIG. 14B in accordance with the pattern of the write section 29b illustrated in FIG. 14A. Then the comparator 37c produces the output signal shown in FIG. 14C. In the present embodiment, in synchronism with a raising edge of the output signal from the comparator 37c, there is produced a gate signal shown in FIG. 14D and during this gate signal the focus correction signal $\Delta_i$ is cut off for a short time and the focusing and tracking controls are effected with respect to the pre-record section 29a. After that the focus correction signal $\Delta_i$ is supplied to the D/A converter 39a so that the writing light beam is focused on the write section 29b. After the head 2 has become stationary, the data is detected.

FIG. 15 is a perspective view showing a head of another embodiment of the card reading and writing apparatus according to the invention. In this embodiment, portions similar to those of the previous embodiments are denoted by the same reference numerals. The housing 3 of the head 2 is supported by four resilient wires 15 movably in the directions Y and Z so as to effect the tracking control and focusing control. For this purpose, on an outer surface of the housing a focusing coil 41 is wound and four tracking coils 42 of flat shape are also wound on the focusing coil 41. By generating magnetic fluxes passing through the focusing coil 41 and parts of the tracking coils 42 which parts extend in the direction Z, the housing 3 can be moved in the directions Z and Y by conducting currents through the coils 41 and 42, respectively.

In the housing 3 are arranged a semiconductor laser 4, objective lenses 10 and 12, a light emitting diode 11 and photodetector 13. In this embodiment, a writing laser beam emitted from the semiconductor laser 4 is reflected by a mirror 43 and then is focused on a card not shown by means of an objective lens 44 along an optical path which is perpendicular to the surface of the card. The mirror 43 is secured to the housing 3 via a piezoelectric bimorph cell 45 so that the laser light spot can be moved on the card in the direction Y. The semiconductor laser 4, light emitting diode 11, and photodetector 13 are connected to ICs 46 and 47 via conductors. A reading light beam emitted from the light emitting diode 11 is made incident upon the card along an inclined optical path, and a light reflected from the card is made incident upon the photodetector 13 also along an inclined optical path. An incident plane containing these inclined optical paths is made normal to the surface of the card.

FIG. 16 shows a format of an embodiment of the optical card according to the invention which is used in conjunction with the head 2 shown in FIG. 15. In this embodiment, each track unit C is divided into a number of frames F and data is recorded within the frame units.

Each track unit C is further divided into twenty lines, and in the tenth line there is formed a control track E for detecting clock pulses, focusing error and tracking error. In the twentieth line there is formed a frame line H from which a frame synchronizing signal can be derived. Above and below the control track E there are arranged data byte arrays. In this embodiment, each byte is constituted by eight bits. In front of each frame F there is provided a frame number section G in which a frame number is recorded. In FIG. 16, portions denoted by hatching are black areas and the remaining portions are white. In the frame number section G, the frame number is recorded in the twelfth to nineteenth lines, and an area constituted by the first four lines is used as a pre-write section I for determining the intensity of the recording laser beam. In this embodiment, the pre-write section I is divided into eight portions $I_1$ to $I_8$. This will be explained later. At least in the frame and frame number sections F and G, the card comprises a surface layer having a low reflection and a record layer formed by gelatin having color dispersed therein formed of a silver group which is changed from a high reflection (representing a high level 1 of bivalent signal) into a low reflection (representing a low level 0 of bivalent signal). A number of circular parts of the record layer are not covered by the low reflective surface layer.

FIG. 17 is a plan view showing a detector pattern of the photodetector 13. The photodetector 13 comprises sixteen data reading detectors 13a-1 to 13a-8 and 13a-9 to which 13a-16 correspond to data pits of a data array extending in the direction Y, eight clocking detectors 13b-1 to 13b-4 arranged in the direction X at a constant pitch, four tracking and focusing detectors 13c-1 to 13c-4, and a detector 13e-1 for detecting the frame line H. The tracking and focusing detectors 13c-1 to 13c-4 are extended in the direction X and detectors 13c-1, with 13c-2 aligned in the direction Y and detectors 13c-3 and 13c-4 also aligned in the direction Y. As can be seen from FIG. 17, the detectors are arranged substantially in a cross.

FIG. 18 is a block diagram of a signal processing circuit of the apparatus. Outputs of the detectors 13a-1 to 13a-16 and 13e-1 are connected to a bivalent circuit 51 and outputs of the detectors 13b-1 to 13b-8 are supplied to a clock generator circuit 52. In the clock generator circuit 52, a first sum of outputs from the detectors 13b-1, 13b-3, 13b-5 and 13b-7 and a second sum of outputs from the detectors 13b-2, 13b-4, 13b-6 and 13b-8 are derived, and then the difference between the first and second sums is used to generate clock pulses under the control of a central processing unit (CPU) 53. The clock pulses thus generated are supplied to the bivalent circuit 51 and the CPU 53. In the bivalent circuit 51, the outputs from the detectors 13a-1 to 13a-16 and 13e-1 are converted into bivalent signals in synchronism with the clock pulses. The bivalent signals are supplied to the CPU 53 and an error correction circuit (ECC) 54 via a latch circuit 55. The ECC 54 corrects errors in the readout data signal under the control of the CPU 53 and the corrected data signal is stored in a RAM 56.

Output $C_1$ from the detector 13c-1 is supplied to adders 57 and 58, output $C_2$ from the detector 13c-2 is supplied to adders 57 and 59, output $C_3$ from the detector 13c-3 are supplied to adders 60 and 58, and output $C_4$ from the detector 13c-4 are supplied to adders 60 and 59. Then output $C_1+C_2$ from the adder 57 and output $C_3+C_4$ from the adder 60 are supplied to a first differential amplifier 61 to derive a difference therebetween, and the difference thus derived is supplied to a focus control circuit 62. Further, a difference between outputs $C_1+C_3$ and $C_2+C_4$ from the adders 58 and 59, respectively, is derived by a second differential amplifier 63 and is supplied to a tracking control circuit 64. The focus control circuit 62 detects the focusing error and supplies a focusing error correction signal to the focusing coil 41 in accordance with the detected focusing error. The tracking control circuit 64 detects a tracking error and supplies a tracking error correction signal to the tracking coil 42. In this manner it is possible to effect the focusing control and tracking control.

The CPU 53 controls the light emitting diode 11 via a light emitting diode driving circuit 65 so that the optical card 1 is spot-illuminated. The CPU 53 further controls the semiconductor laser 4 via a laser driving control circuit 66 and a D/A converter 67 so that data is recorded on the card 1.

The bivalent circuit 51, clock generator circuit 52, latch circuit 55, adders 57 to 60 and differential amplifiers 61 and 63 are included in the IC 46, and the focusing and tracking control circuits 62 and 64, LED driving circuit 65, laser driving circuit 66 and D/A converter 67 are included in the IC 47. As shown in FIG. 15 the ICs 46 and 47 are arranged near the photodetector 13 in the housing 3 of the head 2, and thus the signal processing circuit is hardly affected by noise.

Now the operation of the apparatus will be explained. The data is read or recorded in synchronism with the clock signal obtained by processing the outputs from the detectors 13b-1 to 13b-8 while the card 1 and head 2 are moved in the direction X.

Figure 19:
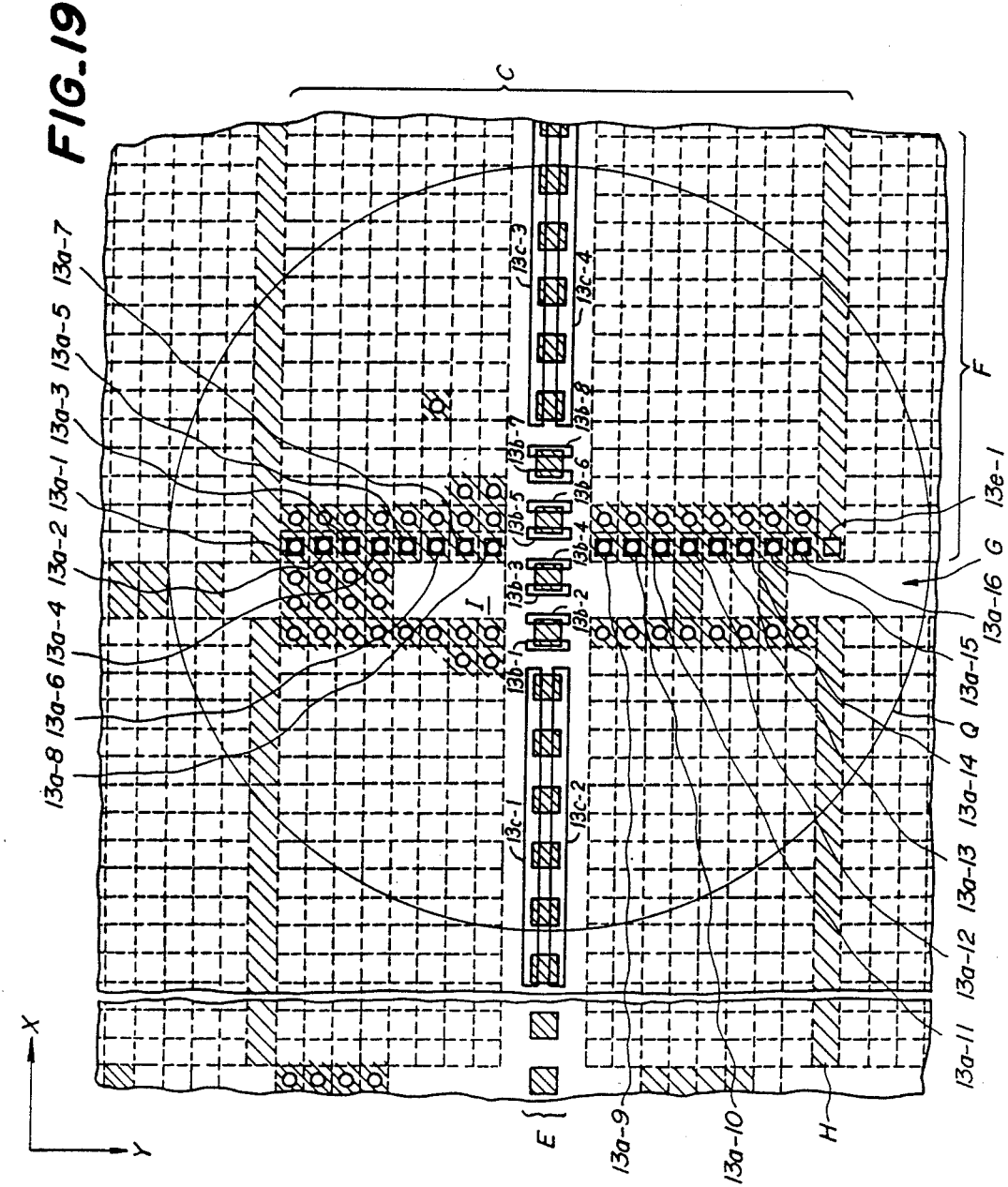
FIG. 19 is a schematic view depicting the positional relationship between the photodetector and the pits on the card.

In the readout mode, the semiconductor laser 4 is deenergized, and only the light emitting diode 11 is driven, so that the card 1 is illuminated by the beam spot Q as shown in FIG. 19. The image of the spot Q is formed on the photodetector 13. While the focusing control and tracking control are effected by processing the output signals from the detectors 13c-1 to 13c-4, the output signal from the detectors 13a-1 to 13a-16 and 13e-1 are read in synchronism with the clock pulses generated by processing the output signals from the detectors 13b-1 to 13b-8 to derive the data signal and frame synchronizing signal. The data signal is stored in the RAM 56 via the ECC 54.

In the writing mode, the light emitting diode 11 is also energized to effect the focusing and tracking controls and to generate the clock pulse. In synchronism with the clock pulse, the writing beam from the semiconductor laser 4 is modulated in accordance with a data signal to be recorded, and the data is written in a given frame F. Prior to such a writing operation, the intensity of the writing light is determined. To this end, the writing beam is projected onto the write portions I-1 to I-4 successively by rotating the mirror 43 with the aid of the bimorph cell 45, while the intensity of the writing beam is varied. Then the outputs from the detectors 13a-1 to 13a-4 are detected to check the recorded condition of the write portions I-1 to I-4. Next the writing beams having different intensities are made incident upon the write portions I-5 to I-8 successively, and the recorded condition of these pre-write portions is detected by processing the outputs from the detectors 13a-1 to 13a-4. In order to change the intensity of the writing laser beam emitted from the semiconductor laser 4 in the manner mentioned above, the eight laser driving current levels (digital values) are set in the laser driving circuit 66. While the writing laser beam is moved in the direction Y by means of the bimorph cell 45, the intensity of the writing beam is set to a level at which no recording is carried out, and the outputs from the detectors 13a-1 to 13a-4 are detected. After it has been confirmed that the writing beam is incident on one of the pre-write portions I-1 to I-8, the intensity of the writing beam is increased to a predetermined level. In this manner, the recording can be performed at the correct position.

After the output signals from the detectors 13a-1 to 13a-4 have been stored in the CPU 53 by scanning the pre-write portions I-1 to I-8 with the writing beam, the CPU 53 selects the minimum intensity level of the writing beams by means of which the bivalent signal "0" has been recorded on a pre-write portion. Then the data signal is recorded on the frame F by using the writing beam having the minimum intensity thus detected. Also in the recording operation, prior to the actual recording, the intensity of the writing beam is reduced to the non-recordable level so that the position of the card on which the writing beam is made incident is checked.

In the present embodiment, before the recording operation, the suitable intensity of the writing beam is detected by using the pre-write section I situated between successive frames F. Therefore, the data signal can be recorded accurately on the card 1 without being influenced by the temperature and sensitivity of the card, the ambient temperature, and the variation in intensity of light emitted by the semiconductor laser 4. so that the record capacity of the card can be utilized to the maximum extent.

FIG. 20 illustrates another embodiment of the optical system of the head according to the invention. In this embodiment, the light emitted from the light emitting diode 11 is made incident upon the card 1 in an inclined fashion via the half mirror 9 and the objective lens 12. The light reflected from the card 1 is made incident upon the photodetector 13 by means of the objective lens 10. The writing beam emitted from the semiconductor laser 4 is reflected by the half mirror 9 and is made incident upon the card 1 by the objective lens 12 in an inclined fashion. The light reflected by the card 1 is made incident upon the photodetector 13 by means of the objective lens 10. In order to move the writing beam in the direction Y on the card 1, the half mirror 9 is moved by the bimorph cell 45. In the present embodiment, the objective lens 44 may be deleted as compared with the embodiment shown in FIG. 15, so that the number of parts can be reduced, assembly is easier and the cost can be decreased.

FIG. 21 shows still another embodiment of the optical head according to the invention. The arrangement of the light emitting diode 11, objective lenses 10 and 12 and photodetector 13 is the same as in the previous embodiments. In the present embodiment, the writing laser beam emitted from the semiconductor laser 4 is reflected by the half mirror 9 arranged in the reflection light path of the illumination light, and then is made incident upon the card 1 by means of the objective lens 10. The writing beam reflected by the card 1 is made incident upon an additional photodetector 72 via the objective lens 12 and an additional half mirror 71 which is arranged in a projection light path of the illumination light emitted from the light emitting diode 11. The half mirror 9 is moved by the bimorph cell 45 so that the writing laser beam is moved in the direction Y of the card 1. The additional photodetector 72 has an array of sixteen detectors 72a-1 to 72a-16 similar to the detectors 13a-1 to 13b-16 of the photodetector 13. By processing the output signals from the detector array of the additional photodetector 72, it is possible to confirm that the writing beam is made incident upon a desired data pit position, and then the intensity of the writing beam is increased to the previously determined level to record a data signal.

In the present embodiment, the writing beam is made incident upon the card 1 along the optical axis through which the reading light reflected by the card is made incident upon the photodetector 13. Therefore, even if there is a slight focusing error, it is possible to record the data signal at a correct position on the card.

FIG. 22 illustrates another embodiment of the track format of the optical card according to the invention. A card 75 comprises a number of data tracks 77 divided by guide tracks 76. That is to say, each data track 77 is formed by a single line. Each data track 77 is divided into a number of sectors by sector start patterns 78 and sector end patterns 79 viewed in the direction X.

In the recording operation, the writing beam is made incident upon a space between the sector start pattern 78 of a relevant sector and the sector end pattern 79 of the preceding sector at different intensity levels to form pre-write portions 80 to 83, while the card 75 is fed leftward. The record condition of these pre-write portions 80 to 83 is checked to determine the optimal intensity of the writing beam. The recording on the sector is effected with the thus detected intensity level of the writing beam.

FIG. 23 depicts an optical system of the optical head in the present embodiment. The optical system of the head of this embodiment is similar to that shown in FIG. 10, so its explanation is omitted. However, the construction of the photodetector 13 is somewhat different from that of the photodetector 13 shown in FIG. 10.

FIG. 24 illustrates the construction of the photodetector 13 shown in FIG. 23. The photodetector 13 comprises a first array of detectors 13a-1 to 13a-5 extending in the direction Y, a second array of detectors 13b-1 and 13b-2 extending in the direction X and four focusing and tracking detectors 13c-1 to 13c-4.

FIG. 25 shows an image of the card 75 formed on the photodetector 13. By processing output signals from the detectors 13c-1 to 13c-4 it is possible to perform the focusing and tracking controls. The pre-write portions 80 to 83 are detected by the detector 13b-1 so that the optimum intensity of the writing beam is determined. It should be noted that the detector 13b-2 is used to detect the recording condition of another write portions, when the card 75 is fed rightward. In the present embodiment, five data tracks 77 are simultaneously read by means of the five detectors 13a-1 to 13a-5 arranged in the direction Y, so that the reading can be performed within a short time period.

What is claimed is:

1. An optical card for storing data as optically readable pits comprising:
   (a) a substrate having a data storage area; and
   (b) a plurality of track units formed in the data storage area, each of said track units comprising:
      (i) a data section comprised of two sets of data tracks, wherein, each set of data tracks includes an equal number of a plurality of adjacent data tracks, each data track comprises a plurality of optically readable data pits in linear alignment, all data tracks within both sets of data tracks are aligned in a first direction in parallel with each other and are aligned in a second direction perpendicular to said first direction so that said data pits are aligned in a column in said second direction thereby forming one or more bytes of simultaneously readable data, and wherein there is no vacant space between adjacent pits within a set of data tracks when viewed in either the first or second direction;
      (ii) a control track situated between the two sets of data tracks and aligned in the first direction in parallel with said data tracks, said control track being comprised of a plurality of control blocks each having the same configuration and being equidistantly spaced from each other as viewed in the first direction; and
      (iii) a track address section disposed at one or both ends of each track unit as viewed in the first direction, said track address section being comprised of data tracks wherein information identifying a track unit is recorded, said information including a track unit identifier that generically identifies a track unit, and a track number that uniquely identifies a track unit.

2. A card according to claim 1, wherein each track address section includes data tracks in alignment with the data tracks in the data section as viewed in the first direction.

3. A card according to claim 2, wherein each track unit identifier consists of a fixed pattern of optically readable data pits common to each track unit.

4. A card according to claim 3, wherein said fixed pattern is stored in the data tracks located at the outermost edges of the track unit as viewed in the second direction.

5. A card according to claim 1, wherein said control blocks are formed in a rectangular or square shape and successive control blocks are separated from each other in the first direction by a distance equal to the length of a control block as viewed in the first direction.

6. A card according to claim 5, wherein said control block length is equal to an integral multiple of the length of an optically readable data pit as viewed in the first direction.

7. A card according to claim 6, wherein said integral multiple is two.

8. A card according to claim 1, wherein each of said data tracks in the data section is divided into a plurality of frames as viewed in the first direction.

9. A card according to claim 8, wherein a frame line from which a frame synchronizing signal can be derived is disposed adjacent to and parallel with either or both of the outermost data tracks of the track unit as viewed in the second direction.

10. A card according to claim 9, wherein between successive frames there is provided a frame number section on which a frame number is recorded.

11. A card according to claim 10, wherein said frame number section includes a blank area on which a plurality of pits can be written by a laser beam using different intensity levels.

12. A card according to claim 1, wherein said substrate is comprised of a plurality of levels of varying height with respect to a third direction normal to both first and second directions and a transparent protection layer is applied over the substrate.

* * * * *